R. S. MAXWELL.
LOADING DEVICE FOR AUTOTRUCKS.
APPLICATION FILED JUNE 30, 1916.
1,231,182.
Patented June 26, 1917.
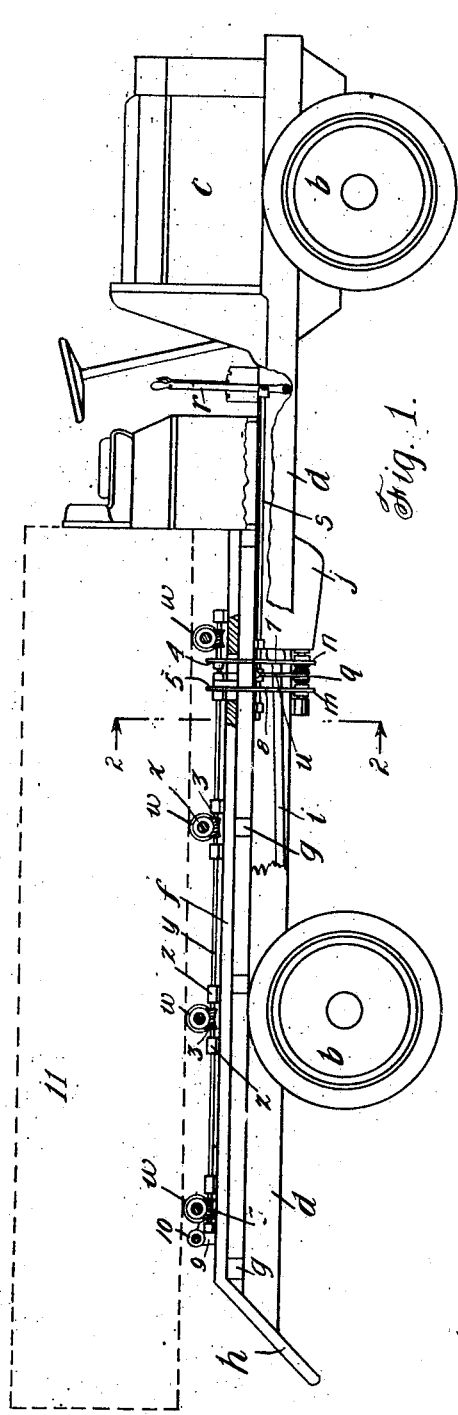
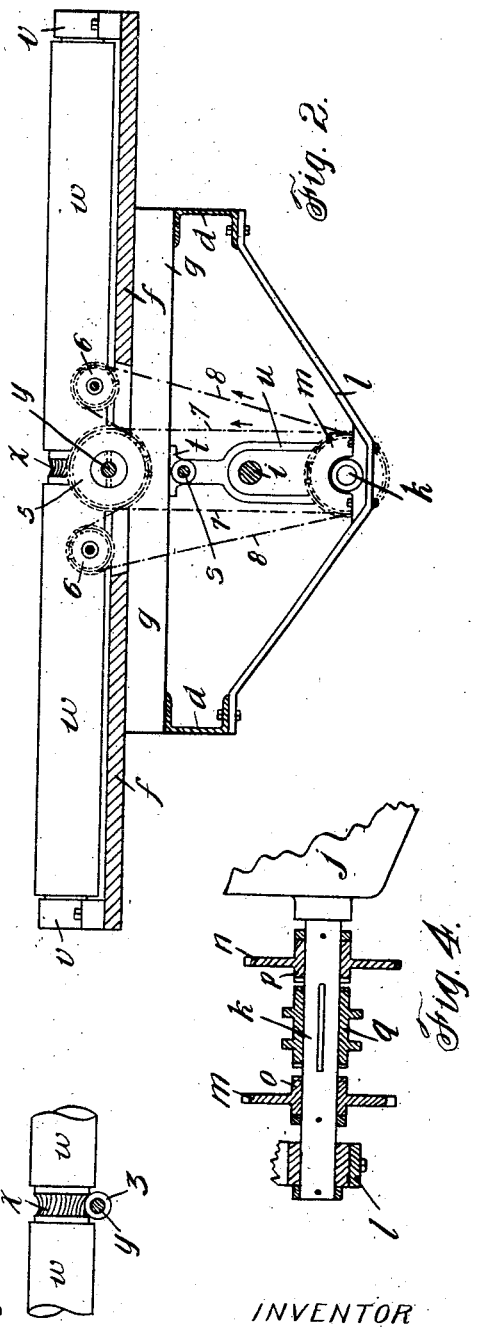
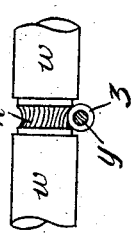
INVENTOR
Ralph S. Maxwell
BY
T. J. Geisler
ATTY.

UNITED STATES PATENT OFFICE.

RALPH S. MAXWELL, OF PORTLAND, OREGON, ASSIGNOR OF ONE-HALF TO JULIA M. PARKER, OF PORTLAND, OREGON.

LOADING DEVICE FOR AUTOTRUCKS.

1,231,182.  Specification of Letters Patent. Patented June 26, 1917.

Application filed June 30, 1916. Serial No. 106,955.

*To all whom it may concern:*

Be it known that I, RALPH S. MAXWELL, a citizen of the United States, and a resident of the city of Portland, county of Multnomah, State of Oregon, have invented a new and useful Improvement in Loading Devices for Autotrucks, of which the following is a specification.

My invention relates to an automobile truck of which the floor of the body is provided with driven rollers operable to facilitate the loading and unloading of the truck.

One of the main objects of my invention is to provide simple and efficient means, for the purpose mentioned, especially adapted for use on auto trucks of the present preferred type.

It is further the object of this invention to take the roller driving-power from the auto engine, at the same time so to arrange the transmission as to operate silently. Also, to place the roller driving mechanism in the longitudinal center of the truck body, and thus in a more protected and out of the way position.

Other features of my invention, as well as the details thereof, are hereinafter fully described, reference being had to the accompanying drawings, in which:

Figure 1 is a side elevation, partly in section, of a truck equipped with my improved power driven rollers;

Fig. 2 is a larger-scale sectional view taken on the line 2—2 of Fig. 1;

Fig. 3 is a fragmental detail showing the construction of one of the rollers; and Fig. 4 is a still larger-scale longitudinal section, showing parts of the driving mechanism.

*a* represents an automobile truck, of which *b* are the wheels, *c* the power plant, *d* the longitudinal chassis beams, and *f* the floor, spaced above the chassis beams *d* by cross beams *g*. *h* is a rigid inclined tailboard of the type commonly used on lumber trucks.

The type of truck shown in the drawings is one commonly known as a worm driven truck, that is, one in which the longitudinal propeller shaft *i* is provided with a worm adapted to drive a worm gear on the rear axle. The variable transmission gearing is indicated in its entirety by *j* and transmits speed from the power plant *c* to the propeller shaft *i*.

As the devices which form my invention are adapted to operate, for the greater part, while the machine is standing still, I find it necessary to take power from an engine element, and in my present case I have shown an extended stud shaft *k* which forms an extension of the engine shaft running through the transmission gear *j*. The rear end of said shaft is journaled in a bracket *l* supported from the chassis beams *d*, as shown in Fig. 2. Loosely mounted on said shaft are the sprockets *m, n*, the latter being made with opposed clutch faces *o, p*. Slidably keyed on the shaft *k*, between the sprockets *m, n*, is a clutch sleeve *q*. The latter is normally driven at all times, while the sprockets *m, n*, when not engaged with the said clutch sleeve, are inactive. However, when the clutch sleeve is shifted into engagement with either of the clutch faces of the sprockets, that corresponding sprocket will be caused to rotate with the shaft *k*. As a means for controlling this clutch mechanism, I provide an operating lever *r*, to which is pivoted a longitudinal shaft *s*, slidably mounted in bearings *t* beneath the floor of the truck. Fixed on said shaft *s* is a shifter yoke *u*, and the operation of the lever *r* will cause said clutch mechanism to be placed either in neutral or in active engagement with either of the sprockets, as selected. Rotatably mounted in boxes *v* on the floor of the truck are the transverse rollers *w*, said rollers being provided near their middle portion with worm gears *x*, the outer diameters of which are slightly smaller than that of the rollers. A longitudinal shaft *y* is journaled in boxes *z* on the floor of the truck, said shaft having fixed thereon worms 3, which are in engagement with and adapted to drive the gears *x* and therewith the rollers *w*, the worms and gears being so arranged that the rollers will always be driven together in one direction. Sprockets 4, 5 are rigidly fixed on the shaft *y*, above the sprockets *m, n*, and idler sprockets 6 are mounted on opposite sides of the sprocket 5 and in the same vertical plane therewith. A drive chain 7 forms a direct drive between the sprocket *n* and the sprocket 4, and a drive chain 8 forms a reversing drive between the sprocket *m* and the sprocket 5, the direction of travel of these chains being shown by the arrows in Fig. 2. When the clutch mechanism is disengaged, the sprockets *m, n* will idle, and the rollers $w$ will remain inactive. When, however, the clutch is engaged so as to cause the sprocket $n$ to rotate, a direct drive will be transmitted to the rollers $w$ and they will be caused to rotate clockwise. When, however, the clutch mechanism is engaged so as to place the sprocket $m$ in driving state, the shaft $y$ will be driven in a reverse direction and the rollers will be caused to rotate counter-clockwise. Mounted in boxes 9 behind the rear roller $w$ is an idler roller 10, the highest portion of which is slightly below the plane of the top of said rear roller. 11 represents a load carried by the truck.

The general operation is as follows:

When the load 11 is to be rolled off the truck, the lever $r$ is thrown backward, whereupon the sprocket $m$ will be placed in driving engagement and the rollers will rotate counter-clockwise, thereby rolling the load backward. When the center of gravity of the load has passed over the rear roller $w$, the rear end of the load will tip downward. The load will then be caused to bear directly on the idler roller 10 and lifted off the roller $w$, so as to remove all stress from the latter, and in view of the fact that the roller 10 is an idler, it will adjust its speed of rotation to the speed at which the load rolls off.

When the load 11 is to be rolled onto the truck, the latter is first backed in under the load, which is mounted on a loading device known as a yard truck, which may be of the type shown by me in my application for patent filed May 16, 1916, Serial Number 97,963. The front end of the load is thus caused to drop down on the rear roller $w$, and when the lever $r$ is then thrown forward so as to engage the sprocket $n$, the rollers $w$ will rotate clockwise and carry the load onto the truck to the position shown by the dotted lines in Fig. 1.

I claim:

1. In an auto truck having a longitudinal drive-shaft, the combination of a pair of gears loose on the drive-shaft, a clutch-sleeve on the drive-shaft, means on the gears and the clutch-sleeve for engaging the latter with either of the former, a supplemental shaft journaled longitudinally in the truck body, a plurality of transverse rollers on the truck body, driving connections between the supplemental shaft and the transverse rollers, companion gears fast on the supplemental shaft, operating connections between the related gears, and means for shifting the clutch sleeve.

2. In an auto truck having a longitudinal drive-shaft, the combination of a pair of gears loose on the drive-shaft, a clutch-sleeve on the drive-shaft, means on the gears and the clutch-sleeve for engaging the latter with either of the former, a supplemental shaft journaled in the longitudinal center of the truck body, a plurality of transverse rollers on the truck body, coöperating worm-gear elements carried by the supplemental shaft and the transverse rollers, companion gears fast on the supplemental shaft, operating connections between the related gears, and means for shifting the clutch-sleeve.

3. In an auto truck having a longitudinal drive-shaft, the combination of a pair of sprocket gears loose on the drive-shaft, such sprocket gears provided with opposed clutch faces, a clutch-sleeve on the drive-shaft adapted for being engaged with either of said sprocket gears, a supplemental shaft journaled longitudinally in the truck body, a plurality of transverse rollers on the truck body, driving connections between the supplemental shaft and the transverse rollers, companion sprocket gears fast on the supplemental shaft, sprocket chains connecting the related gears, and means for shifting the clutch sleeve.

4. In an auto truck having a longitudinal drive-shaft, the combination of a pair of sprocket gears loose on the drive-shaft, such sprocket gears provided with opposed clutch faces, a clutch-sleeve on the drive-shaft adapted for being engaged with either of said sprocket gears, a supplemental shaft journaled longitudinally in the truck body, a plurality of transverse rollers on the truck body, coöperating worm-gear elements carried by the supplemental shaft and the transverse rollers, companion sprocket gears fast on the supplemental shaft, sprocket chains connecting the related gears, and means for shifting the clutch-sleeve.

RALPH S. MAXWELL.